United States Patent [19]

Sato et al.

[11] Patent Number: 5,699,547

[45] Date of Patent: Dec. 16, 1997

[54] INFORMATION RETRIEVAL SYSTEM WITH SERIAL ACCESS DATA STORAGE AND RANDOM ACCESS DATA RETRIEVAL

[75] Inventors: Takashi Sato, Scarborough; Carlo Basile, Ossining, both of N.Y.

[73] Assignee: Philips Electronics North America Corporation, New York, N.Y.

[21] Appl. No.: 521,191

[22] Filed: Aug. 30, 1995

[51] Int. Cl.⁶ .................................................. G06F 13/00
[52] U.S. Cl. .......................... 395/438; 395/440; 395/481; 395/872; 369/14; 369/15
[58] Field of Search ........................ 395/438, 440, 395/481, 872; 369/14, 15

[56] References Cited

U.S. PATENT DOCUMENTS

| 4,508,001 | 4/1985 | Suzuki | 84/1.01 |
| 5,305,155 | 4/1994 | Akagiri et al. | 360/32 |

FOREIGN PATENT DOCUMENTS

| WO9215087 | 2/1992 | European Pat. Off. . |
| 2204180 | 4/1988 | United Kingdom . |
| 9215087 | 9/1992 | WIPO . |

Primary Examiner—Tod R. Swann
Assistant Examiner—Denise Tran
Attorney, Agent, or Firm—Leroy Eason

[57] ABSTRACT

An information retrieval system in which information is stored in digital form in a serial access device such as a digital VCR, the information being organized as a library of successive albums, each album having successive tracks of individually identifiable items of information, such as audio performances, subjects or events. A random access device, such as a compact disc player or magnetic hard disc drive, has stored therein a portion of a preselected track of each album and a brief introductory portion of each of the remaining tracks in each album. Both devices are coupled to a common data bus and are controlled by a programmable processor so that during search intervals of the serial access device to access a selected album or track read-out thereof is initiated by the random access device. When the serial access device is ready to access selected track or album, read-out is switched over thereto. In this way the required storage capacity of the random access device is minimized while still providing random access to any album and to any track in an already designated album.

8 Claims, 2 Drawing Sheets

INFORMATION RETRIEVAL SYSTEM WITH SERIAL ACCESS DATA STORAGE AND RANDOM ACCESS DATA RETRIEVAL

BACKGROUND OF THE INVENTION

1. Field of the Invention

The invention relates to the field of information storage and retrieval, and more particularly to an information retrieval system wherein information is stored in digital form in a serial access device such as a magnetic or optical tape recorder, and specified portions thereof can be retrieved by random access without having to await traversal of intervening portions of the recorded data.

Such a system can, for example, provide real time random access to a specified track in a comprehensive library of albums of data tracks which represent respective audio performances or other identifiable items of information.

2. Description of the Related Art

A serial access data storage device such as a digital audio tape recorder operates at the normal audio data reproduction rate of 256 Kbps (kilobits per second). The play time for an album of 15 tracks, each track being an individual selection, is therefore 54 minutes. For a comprehensive library of, for example, 400 albums, the total play time would be 360 hours. Even though the search speed of such a recorder is typically 200 times the play speed, it could take almost 2 hours to access a specified track in a specified album of such a library.

This long retrieval time can be alleviated by employing a storage device which operates at much higher than the audio data rate, such as a consumer digital video cassette recorder or VCR. Such a recorder has a playback rate of about 100 times the audio data rate, or 25 Mbps, and the search speed is about 200 times the playback rate. The storage capacity for 400 albums would be 41.5 Gbytes, and the maximum access time, depending on the location to be addressed, ranges between 33.2–66.4 seconds. In such a recorder the recorded data is encoded for purposes of error correction and data compression, and so it would be used with an intermediate buffer memory to convert from the recorder data rate to the audio data rate and a decoder to decode the encoded data and recover the original audio data. The maximum access time of about 1 minute is, of course, a major improvement over the nearly 2 hour maximum access time of an audio tape recorder, but is still too slow to be convenient for most users.

There are, of course, random access storage devices, for example compact disc players and magnetic hard disc drives as used in personal computers, which provide virtually immediate access to data at any storage address therein. However, the storage capacity of a typical magnetic hard disc is only about 1 Gbyte, far short of the over 40 Gbytes required for a comprehensive library of 400 albums as proposed.

Obviously, it would be of significant advantage if a serial storage device of high capacity, such as a digital VCR, could be provided with random access capability.

SUMMARY OF THE INVENTION

The invention provides an information retrieval system which includes a high capacity serial access device, such as a digital VCR, and a relatively lower capacity random access device, such as a compact disc player or magnetic hard disc drive. Read-out from both devices is coordinated by a programmable processor, the data so read being provided over a common bus to a buffer memory for data rate conversion. A complete library of albums, each including a plurality of data tracks, is stored in the serial access device. In addition, stored in the random access device is a portion of one preselected track from each album, as well as a brief introductory interval of each of the remaining tracks in each album, so that all tracks of all albums are represented but not actually stored in the random access recorder. For a 400 album library as suggested above, there will be 660 Mbytes of data from preselected tracks and 134 Mbytes of data from non-preselected tracks, for a total of 794 Mbytes. This is well within the typical 1 Gbyte capacity of a magnetic hard disc drive.

When a user indicates an album selection to the processor, the processor issues a command to both devices to access such album. Read-out by the random access device of the stored portion of the preselected track of the relevant album is initiated immediately, and before reproduction of that data (at the audio rate) has been completed, the serial access device will have reached the location therein of data from the remaining portion of the preselected track of the relevant album. The processor then switches access to the common bus over to the serial access device and read-out is continued therefrom. If the user indicates a track other than the preselected track in a previously designated album, the serial access device being already positioned at such album, the processor controls the random access recorder to read-out the brief introductory interval stored therein of the addressed track in such album. During reproduction thereof (again at the audio rate) the serial access device will have reached the storage location therein of the addressed track. That is detected by the processor, since both devices are then at corresponding track addresses, and the processor then switches access to the common bus over to the serial access device and read-out is continued therefrom. The result is that, as perceived by the user, the serial access device apparently provides random access availability because there is no delay in reproduction of his selection.

BRIEF DESCRIPTION OF THE DRAWINGS

The invention will be described in more detail with reference to preferred embodiments thereof and the accompanying drawings, wherein.

DESCRIPTION OF THE PREFERRED EMBODIMENTS

Figure 1:
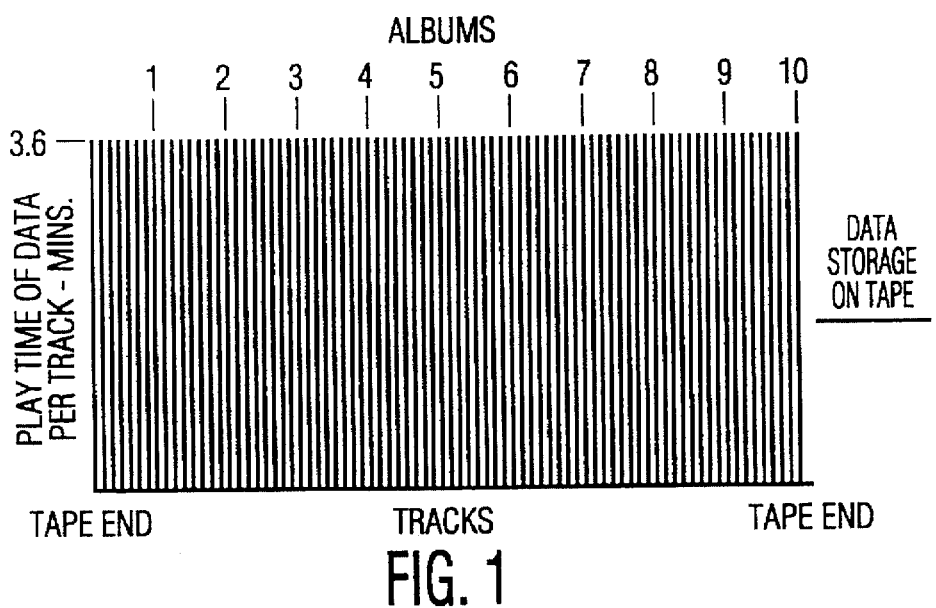
FIG. 1 conceptually shows storage of a library of albums of tracks in a serial access device.

Referring to FIG. 1, this conceptually shows storage in a serial access high speed device, such as a digital video cassette recorder (VCR), of a library of albums each of which includes a number of tracks, a track being an identifiable selection such as, for example, a particular audio performance, event, or subject. For simplicity of illustration only 10 albums are shown, each having 8 tracks, but the arrangement is the same for a larger library. The length of each track corresponds to the amount of recorded digital information, or data therein. Assuming the information to be audio, the track length will be proportional to the play time of the data thereon at the normal audio data rate of 256 Kbps. That will typically be 3.6 minutes for one selection of a typical compact disc recording. The recorder is bidirectional, and the pickup head may be situated anywhere on the recording medium, e.g. a magnetic or optical tape, when a command is issued for the pickup head to access a specified album and/or specified track. The recording medium will be hereinafter referred to as a tape. The compilation of albums constituting the library would typically be produced by recording on the tape digital data corresponding to a collection of individual albums such as audio compact discs or audio tapes.

The access time, or "worst case" search time, of the pickup head to a specified data location on the tape ranges from a maximum for data located at either end of the tape, since the pickup head could be at the opposite end of the entire tape, to a minimum for data located at the center of the tape, since the pickup head then cannot be more remote than half of the entire tape. Using the example given above, of a library of 400 albums and 15 tracks per album, a consumer digital VCR which operates at 25 Mbps, and recorded data which is audio information having a normal audio playback rate of 256 Kbps, the relevant parameters of the serial access recorder are then as shown in the following Table 1:

TABLE 1

SERIAL ACCESS (VCR) DEVICE

| | |
|---|---|
| No. of Albums | 400 |
| Total Play Time (Audio Playback) | 360 hours (54 mins) per album |
| Required VCR capacity | 41.5 Gbytes |
| Long distance search speed | 200 × 25 Mbps = 5 Gbps |
| Album access time | 33.2–66.4 sec. (depending on album position on tape) |
| Short distance search speed | 33 × 25 Mbps = 825 Mbps |
| Track access time in pre-selected album | 0.5–1 sec. (depends on track location in album) |

It is seen that the access time (worst case search time) to a specified album is between about one-half and one minute, and is between one-half and 1 second to a specified track in a preselected album. The maximum access time to an album is derived as follows:

41.5 Gbytes×8 bits/byte÷5 Gbps=66.4 secs.

That would be for an album at either end of the tape. The minimum album access time would be for an album at the center of the tape, and so is half the maximum or 33.2 seconds.

The maximum access time for a track within a preselected album is derived as follows:

256 Kbps×60 sec/min×54 min/album=829 Mbits/album

829 Mbits÷825 Mbps=1 sec.

That would be for a track at either end of the preselected album. For a track at the center of such album, the access time would be half of that value, or 0.5 sec.

It will be noted that the audio play time of a track is 3.6 minutes, which exceeds the maximum access time of 66.4 seconds to any album. This is significant because, as will be described below, it is thereby possible to complete access to an album by the serial recorder within the play time of a portion of a preselected track in such album played at the normal audio data rate.

Figure 2:
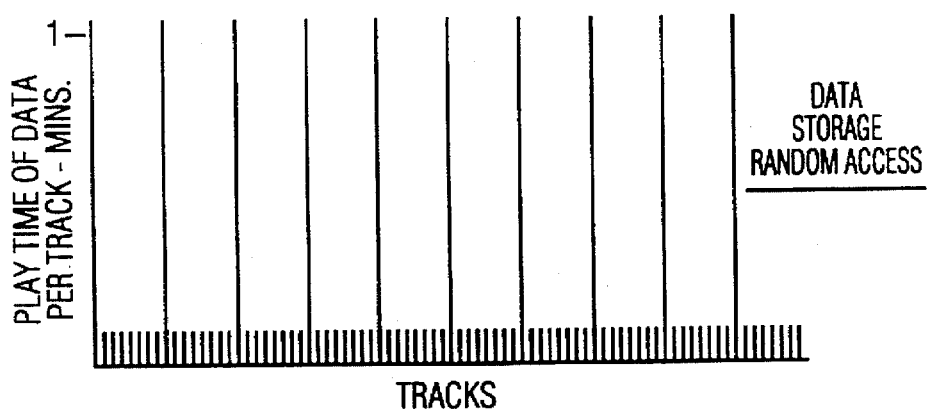
FIG. 2 conceptually shows storage of certain portions of the library in FIG. 1 in a random access device so as to provide random access availability to albums and tracks of said library.

FIG. 2 illustrates how, by using a random access device such as, for example, a compact disc player or magnetic hard disc drive, to supplement the serial access device, it is possible by storing only a limited amount of data in the random access device to achieve apparent continuous readout of data stored in the serial access device. That is, in accordance with the invention, the random access device only need store enough data so that the play time of a stored portion of a data track at the normal reproduction rate will at least equal the access time of the serial access device to the remaining portion of such track. Once that condition has been reached, read-out can be continued from the serial access device. Seamless transition is achieved by assembling all the data in a buffer memory which serves to convert the data therein to the normal reproduction rate, e.g. the audio rate of 256 Kbps.

As seen in FIG. 2, an introductory portion of one preselected track from each album is stored in the random access device. This will usually be the first of such tracks since that simplifies operation, but any track could be preselected in each album. The portion so stored is much less than the complete track, since as noted above the maximum access time of the serial access device to any album is 66.4 secs., as compared with a play time of 3.6 minutes for the complete track. The random access device thus provides virtually immediate random access to the preselected track of any of the albums stored in the serial access device. Thus, instead of having to store all tracks in their entirety as shown in FIG. 1, portions of only certain of such complete tracks, one from each album, are stored in FIG. 2. During reproduction at the normal reproduction rate of data from the portion of a preselected track stored as shown in FIG. 2 from any particular album, the serial access device will have had time to access and continue with read-out of the remaining portion of such track of such album, and further continues with read-out of the remaining tracks of that album.

FIG. 2 also shows storage in the random access device of an even more brief introductory portion of each of the non-preselected tracks in each album, the duration thereof corresponding to the short distance maximum access time of the serial access device from any track in such album to any other track in the same album. As shown in Table 1, the maximum access time within an album is 1 second. Therefore, storing a portion corresponding to 1 second play time (at the audio rate) of each non-preselected track in each album would be sufficient to enable the serial access device to access any non-preselected track of an album after having already been positioned for read-out from such album.

Figure 3:
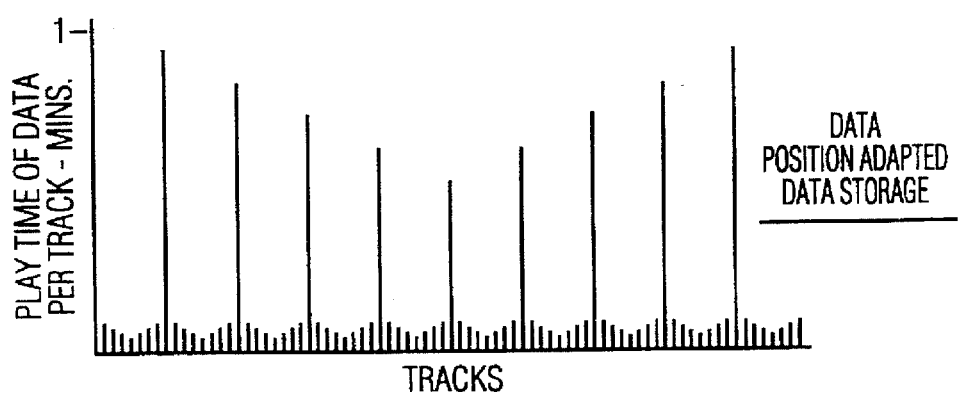
FIG. 3 shows an adaptive data allocation method of minimizing the requisite storage capacity of the random access device in order to enable random access availability to a given size library stored in a serial access device.

As seen in Table 1, the access time both for a particular album and for a particular track varies from a maximum for data located at either end of the entire tape and at either end of each album, to a minimum for data located at the center of the tape and at the center of each album. The minimum access time is half the maximum access time. It is therefore possible, instead of recording the same portions of the tracks in each album, to use an adaptive allocation of the amount of data stored in the random access device depending on the location of the relevant album and track on the tape of the serial access device. Such an adaptive allocation is shown in FIG. 3, wherein, supposing the first track of each album as the preselected track to be stored, approximately equal portions of the preselected tracks of the first and last albums are stored, only half as much of the preselected track of the album at the center of the tape is stored, and for intermediate albums proportionate fractions of the preselected tracks therein are stored. A similar adaptive allocation is used for the non-preselected tracks in each album. Thus, in each album, the stored portions of the first and last of the non-preselected tracks are equal and correspond to the maximum access time within an album of the VCR as described above. The stored portion of the center track is half that of the first and last non-preselected tracks. For intermediate tracks proportionate fractions thereof are stored. Thus, the amount of data required to be stored in the random access device is reduced to the minimum necessary in order to correspond with the access times of the VCR for read-out of a specified album or to a specified track in a previously designated album.

The following Table 2 summarizes the relevant parameters of a random access device as described, such as a hard magnetic disc (MD) drive, for use with a serial access VCR having the parameters shown in Table 1. The access times of the VCR, as shown in Table 1, are repeated here because they are determinative of the amount of data required to be stored in the random access recorder. All of the other parameters applicable to Table 1, i.e., an audio data rate of 256 Kbps, a VCR data rate of 25 Mbps, and 400 albums of 15 tracks each, are also applicable in Table 2.

TABLE 2

RANDOM ACCESS (MD) DEVICE

| | |
|---|---|
| Album access time of VCR | 33.2–66.4 sec. |
| Data on MD from a preselected track in an album | 1.1–2.2 Mbytes/album (depends on album on tape) |
| Total data on MD (preselected tracks) | 660 Mbytes |
| Track access time of VCR within an album | 0.5–1 secs. (depends on data location in album) |
| Data on MD from non-preselected tracks/album | 336 Kbytes/album |
| Total data on MD (non-preselected tracks) | 134 Mbytes |
| MD memory capacity | 660 + 134 = 794 Mbytes |

These entries are explained as follows. An interval of 33.2 sec. corresponds at the normal audio data rate to 33.2 sec.×256 Kbps×⅛ bytes/bit=1.03≈1.1 Mbytes The range of 1.1–2.2 Mbytes/album is an average of 1.65 Mbytes/album for all 400 albums, and so the data from non-preselected tracks is 1.65×400=660 Mbytes.

The range of 0.5–1 secs. track access time averages to 0.75 secs. for all 14 non-preselected tracks in each album. The required data from such tracks on the FED is therefore 0.75×14×256 Kbps×⅛ bytes/bit=336 Kbytes/album For 400 hundred albums, the non-preselected track data is therefore 400×336=134 Mbytes. Combining that with the 660 Mbytes required for the preselected track data, the necessary capacity of the magnetic disc recorder is 660+ 134=794 Mbytes. That is well within the one Gbyte capacity of inexpensive hard magnetic disc drives.

Figure 4:
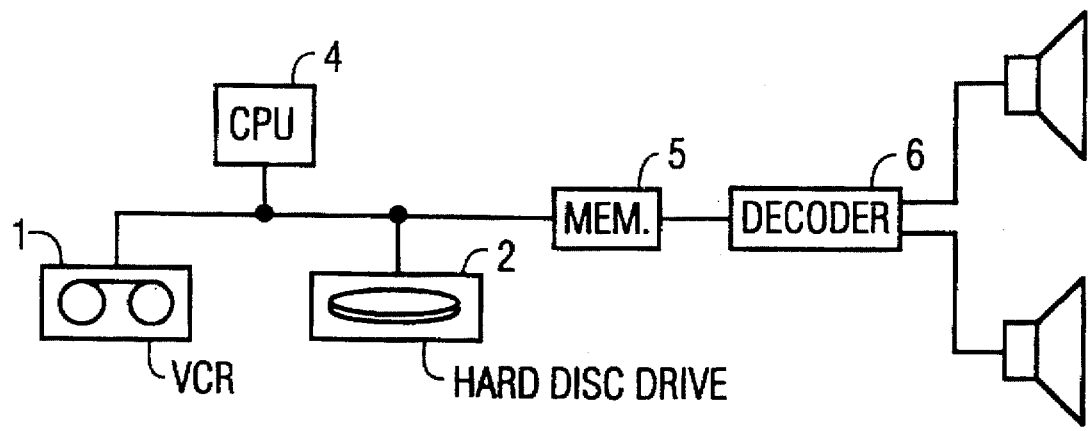
FIG. 4 is a block diagram of an information retrieval system in accordance with the invention.

FIG. 4 is a block diagram of an information retrieval system in accordance with the invention for operation as described above. The serial access device 1 is a digital VCR having the characteristics shown in Table 1, operating at 25 Mbps. A library of audio or other information to be stored, in the form of successive albums each containing a plurality of tracks, is recorded in digital form on the VCR tape. The normal reproduction rate of the stored information is substantially slower than the operating rate of the VCR. For audio information the audio reproduction rate is 256 Kbps.

The VCR 1 and a random access device 2, for example a magnetic hard disc drive (MD) as suggested above, are both coupled to a data bus 3 to which is also coupled a programmable data processor which coordinates operation of both storage devices and access thereof to the data bus at appropriate intervals in order to provide data for continuous reproduction. The data provided to the bus is conveyed thereby to a digital first-in-first-out or FIFO memory 5, which is controlled by processor 3 to provide output of data at the desired reproduction rate, in the case of audio data 256 Kbps. Memory 5 supplies the data at the audio rate to a decoder 6 for decoding and D/A conversion. The resultant signal is supplied to a reproduction facility, shown in this case as a pair of stereo loud speakers.

Initially the storage devices are controlled by processor 3 to record in the MD device 2 the necessary portions of data tracks of the albums already recorded in the VCR 1, so that the stored data in MD device 2 will be sufficient for CPU 4 to maintain memory 4 at a filling level which assures a continuing flow of data at the audio rate to decoder 5 during intervals when VCR 1 is still searching to access a designated album or track. From the description given above it will now be apparent how that is achieved. An introductory portion of a selected track, preferably the first, of the first album in VCR 1 is also recorded in MD device 2. A lesser introductory portion of each succeeding track in the first album in VCR 1 is then also successively recorded in MD device 2, such portion linearly decreasing from the second track to the central track so that the duration of the recorded portion of the central track is approximately half that of the second track, and then linearly increasing for succeeding tracks so that the duration of the stored portion of the last track is the same is that of the second track. This procedure is then repeated for the second and succeeding albums, with similar provision for adaptive allocation of the stored portion of the preselected track of each album. That is, the stored portion of preselected tracks in albums succeeding the first album linearly decreases up to the predetermined track of the album at the center of the library, for which the stored portion of the predetermined track thereof is approximately half that of the predetermined track in the first album. For albums succeeding the central album this procedure is reversed, the stored portions of the predetermined tracks of the succeeding albums linearly increasing until for the last album the stored portion of the predetermined track thereof is approximately the same as for the first album.

It shall be noted that, although coding is not a novel feature of the present invention, the data recorded in the VCR 1 may not be the original audio data to be reproduced but my have been encoded to provide for compression and error correction.

After the necessary data has thus been recorded in the random access MD device, the system is ready for operation as a random access library. It should be understood that random access is provided to any album and also to any track in an already designated album, but not to any track of any newly designated album. This is dealt with further below. Using the processor 4 the user specifies a particular album or albums and tracks thereon to be played. The processor controls the VCR 1, via a conventional selection unit thereof, to commence search to access the indicated choices, and simultaneously switches access to the data bus 3 to MD device 2 so that playback is commenced therefrom in accordance with the first of such choices; e.g., a chosen album. It is assumed that the user has already made a designation of a track, such as the first track, in each album as the preselected track thereof. The MD device 2 is controlled by processor 4 to read-out via bus 3 to buffer memory 5 the stored data corresponding to a portion of the first track in the chosen album, and such data is then read-out from memory 5 to decoder 6 at the normal audio rate, subjected thereby to decoding and D/A conversion, and the resulting signal is supplied to the loudspeakers. While that is occurring, the VCR 1 accesses the chosen album and the preselected track therein. The track address of the data at the pickup head of VCR 1 is monitored by processor 4, which also monitors the address in MD device 2 of data supplied thereby to buffer memory 5. When such addresses correspond to the same data, that means that the pickup head of VCR 1 is in position to continue read-out of a track from where MD device 2 has just left off. The processor 4 then switches access to data bus 3 over to the VCR 1, and playback of the preselected track of the chosen album is continued with data supplied from that recorder.

In the event the user has chosen a particular track of a particular album other than the preselected track thereof, there are two alternative procedures available. The first alternative is to begin with playback of the preselected track of such album, followed without any interruption by playback of the chosen track in that album. This proceeds substantially as described above, except that after completion of read-out of the preselected track of such album the processor 4 controls MD device 2 to read-out the stored introductory portion of the chosen track in such album. Once the VCR 1 is ready to access the remainder of such track the processor 4 switches access to data bus 3 over to VCR 1 and read-out of the chosen track is continued therefrom. The second alternative, which the user can signify to processor 4, is to wait out the access time (between ½ and 1 minute, see Table 2) for VCR 1 to reach the album which contains the chosen track. In that event the processor does not switch access to the data bus to MD device 2 until that occurs, after which MD device 2 is given access to data bus 3 to read-out the portion of the chosen track stored therein. By then VCR 1 will be in position to access that track and operation resumes as described above for the first alternative.

Although the invention has been described with reference to certain preferred embodiments thereof, it will be apparent to those skilled in the art that various modifications and adaptations thereof can be made without departing from the essential scope and teachings of the invention as set forth in the ensuing claims.

What is claimed is:

1. An information retrieval system comprising:
    a serial access device recorder for sequentially storing on a recording tape thereof a library of albums of data tracks, each track including data corresponding to an identifiable item of information, any of the stored tracks being serially accessible by translation of said tape until a pickup head of said device is positioned at a storage address of the relevant data thereon; said device having a maximum access time to any storage address on said tape which is less than the play time of any of said tracks when the data thereon is played at a normal data reproduction rate;
    a random access device for providing random access to addressable data storage locations therein; said data storage locations being for storing
        (i) a copy of the data in at least an introductory portion of a preselected track of each of said albums, said portion for any given album being sufficient so that the play time thereof at said normal reproduction rate is at least equal to the access time of the serial access device to access said preselected track of said given album; and
        (ii) a copy of the data in a more brief introductory portion of each of the non-preselected tracks of each of said albums, said portion of any given non-preselected track of any album being sufficient so that the play time thereof at said normal reproduction rate is at least equal to the access time of the serial access device from the preselected track of said album to said given non-preselected track thereof;
    a data bus coupled in common to each of said devices to receive data read-out therefrom;
    data reproduction means coupled to said data bus to receive data therefrom and reproduce said data at said normal reproduction rate and in a form representative of the information corresponding thereto; and
    a data processor also coupled to said data bus for controlling said devices in conformity with commands supplied to said data processor by a user, said commands signifying albums and tracks stored in the serial access device which are to be reproduced; said data processor controlling said devices so that data is read-out to said data bus from the random access device to maintain continuous reproduction of data during search intervals of the serial access recorder to access a specified album or a specified track of a previously specified album.

2. An information retrieval system as claimed in claim 1, wherein said date processor controls read-out of data from each of said devices to said data bus so that
    (i) in response to a command designating an album the random access device reads-out to said data bus the data stored therein from a portion of a preselected track of said album, read-out to said data bus being switched over to said serial access device when the tape thereof has been translated into position for continued uninterrupted read-out of the data in the remaining portion of said preselected track of said album; read-out of the remaining tracks in said album then being continued by said serial access device; and
    (ii) in response to a command designating a non-preselected track of a previously designated album to which the tape of said serial access device has already been positioned, the random access device reads-out to said data bus the data stored therein of a portion of said non-preselected track; read-out to said data bus being switched over to said serial access device when the tape thereof has reached position for continued uninterrupted read-out of the data in the remaining portion of said non-preselected track.

3. An information retrieval system as claimed in claim 1, wherein said data reproduction means comprises a buffer memory for storing data received from said data bus and controlled by said processor to read-out the stored data at said normal reproduction rate thereof; the processor controlling read-out of data from both said devices so as to maintain said buffer memory at a filling level within a predetermined range during search intervals of said serial access device to a specified album or to a specified track of a previously specified album.

4. An information retrieval system as claimed in claim 1, wherein the serial access device has a higher search speed for accessing a different album and a lower search speed for accessing a different track within a given album; the access time to a predetermined track of any album being determined by said higher search speed and the access time to a non-preselected track of an album being determined by said lower search speed.

5. An information retrieval system as claimed in claim 1, wherein the data in each data track corresponds to audio information and the normal reproduction rate thereof is an audio data rate.

6. An information retrieval system as claimed in claim 1, wherein the data read/write rate of the serial access device exceeds by at least an order of magnitude the normal reproduction rate of the data stored therein.

7. An information retrieval system as claimed in claim 1, wherein the serial access device is a digital video cassette recorder having a data read/write rate of the order of 100 times the normal reproduction rate of the data stored therein.

8. An information retrieval system as claimed in claim 1, wherein the random access device is either a compact disc player or a magnetic hard disc drive.

* * * * *